(12) United States Patent
Wu et al.

(10) Patent No.: US 10,126,710 B2
(45) Date of Patent: Nov. 13, 2018

(54) SPATIAL LIGHT MODULATOR AND METHOD FOR DISPLAYING COMPUTER GENERATED HOLOGRAM USING THE SAME

(71) Applicant: BOE TECHNOLOGY GROUP CO., LTD., Beijing (CN)

(72) Inventors: Naifu Wu, Beijing (CN); Bei Niu, Beijing (CN); Tao Wang, Beijing (CN); Wei Wei, Beijing (CN); Kun Wu, Beijing (CN); Chia Chiang Lin, Beijing (CN); Chunmiao Zhou, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/113,949

(22) PCT Filed: Jan. 14, 2016

(86) PCT No.: PCT/CN2016/070872
§ 371 (c)(1),
(2) Date: Jul. 25, 2016

(87) PCT Pub. No.: WO2017/008483
PCT Pub. Date: Jan. 19, 2017

(65) Prior Publication Data
US 2017/0146953 A1 May 25, 2017

(30) Foreign Application Priority Data
Jul. 14, 2015 (CN) .......................... 2015 1 0413120

(51) Int. Cl.
*G03H 1/12* (2006.01)
*G02B 5/32* (2006.01)
*G03H 1/22* (2006.01)

(52) U.S. Cl.
CPC ... *G03H 1/2294* (2013.01); *G03H 2001/2297* (2013.01); *G03H 2223/19* (2013.01);
(Continued)

(58) Field of Classification Search
CPC ...... G03H 1/08; G03H 1/0808; G03H 1/0841; G03H 2001/0816; G03H 2001/0825;
(Continued)

(56) References Cited

U.S. PATENT DOCUMENTS

2007/0133208 A1 6/2007 Smith et al.
2010/0325513 A1 12/2010 Donegan et al.
(Continued)

FOREIGN PATENT DOCUMENTS

| CN | 104950654 A | 9/2015 |
|---|---|---|
| WO | 2012069811 A2 | 5/2012 |

OTHER PUBLICATIONS

Search Report and Written Opinion dated Mar. 31, 2016 from State Intellectual Property Office of the P.R. China.

*Primary Examiner* — Jade R Chwasz
(74) *Attorney, Agent, or Firm* — Dilworth & Barrese, LLP; Michael J. Musella, Esq.

(57) ABSTRACT

A spatial light modulator and a method for displaying a computer generated hologram are disclosed. The spatial light modulator includes a plurality of MEMS units arranged in an array, each of the MEMS units corresponds to a pixel of a computer generated hologram and includes a sensing device, a light shielding portion and a driving device. The sensing device is configured for receiving position information that is obtained through Roman encoding a pixel corresponding to an MEMS unit including the sensing device and the position information is transmitted to the driving device by the sensing device. The driving device is configured for controlling the light shielding portion to
(Continued)

move to a position corresponding to the position information in response to the received position information of the light shielding portion when the present frame is displayed.

14 Claims, 3 Drawing Sheets

(52) U.S. Cl.
CPC ..... *G03H 2223/50* (2013.01); *G03H 2225/24* (2013.01); *G03H 2227/03* (2013.01)

(58) Field of Classification Search
CPC ..... G03H 2001/0833; G03H 2001/085; G03H 2001/0858; G03H 2210/40; G03H 2210/44; G03H 2210/441; G03H 2210/45; G03H 1/00; G03H 1/0406; G03H 1/2202; G03H 1/2205; G03H 2001/0432; G03H 2001/2207; G03H 2001/2228; G03H 2001/2231; G03H 2001/2289; G03H 1/2294; G03H 2223/19; G03H 2001/2297; G03H 2223/50; G03H 2225/24; G03H 2227/03
USPC .................. 359/32, 35, 27, 9, 10, 11, 21
See application file for complete search history.

(56) References Cited

U.S. PATENT DOCUMENTS

| | | | |
|---|---|---|---|
| 2012/0162732 A1* | 6/2012 | Hong .................. | G03H 1/02 359/9 |
| 2012/0170102 A1 | 7/2012 | Payne et al. | |
| 2013/0147777 A1* | 6/2013 | Lau .................... | G02B 26/00 345/207 |
| 2014/0137670 A1* | 5/2014 | Hata .................. | G01L 1/144 73/862.621 |

* cited by examiner

FIG. 5 receiving, by each sensing device, position information which is obtained through Roman encoding a pixel corresponding to an MEMS unit comprising the sensing device by a computer, wherein the position information is the position information of the light shielding portion of the MEMS unit comprising the sensing device when a present frame is displayed. —S601 transmitting, by the sensing device, the position information of the light shielding portion when the present frame is displayed to the driving device. —S602 controlling, by the driving device, the light shielding portion to move to a position corresponding to the position information of the light shielding portion when the present frame is displayed, in response to the received position information of the light shielding portion when the present frame is displayed. —S603

SPATIAL LIGHT MODULATOR AND METHOD FOR DISPLAYING COMPUTER GENERATED HOLOGRAM USING THE SAME

TECHNICAL FIELD

Embodiments of the disclosure relate to a spatial light modulator and a method for displaying a computer generated hologram using the spatial light modulator.

BACKGROUND

Holographic display technology is classified into conventional optical holography and computer generated hologram (CGH) that uses a digital computer to simulate, compute and process a variety of optical processes. Conventional optical holography records information of phase and amplitude of object light wave on some kind of media in the form of interference fringes through introducing reference light wave that is coherent with the object light wave to interfere the object light wave according to the principle of optical interference, and then reconstruct the original object light wave to form a 3D image of the original object according to the principle of light diffraction. However, the optical holography technology needs a very stable optical system (non-vibrating and noise-free) and a light source having a high coherence and a high intensity, thereby limiting its application scope notably. In order to resolve the above problems, people begin to research computer generated hologram which uses computers to simulate and compute.

With the computer generated hologram technology, a description mathematical function of object light wave is input into a computer directly to simulate an actual interference process, to compute out interference fringes, to draw a computer generated hologram, and then to put the computer generated hologram into an actual light path to get a reconstructed image. Compared with the conventional optical holography, the computer generated hologram has remarkable characteristics such as low-noise, good repeatability and ability to get hologram of a virtual object, etc.

The processes of generation and reconstruction of computer generated hologram is mainly divided into the following 5 steps. The first step involves sampling, that is, to get a value of an object or wavefront in discrete sampling points. The second step is computation, that is, to compute optical field distribution of object light wave on the hologram plane. The third step is encoding, that is, to encode complex amplitude distribution of the light wave on the hologram plane into transmissivity variation of hologram. The fourth step is mapping, that is, to draw the transmissivity variation into a graph under the control of a computer. If the resolution of the plotting equipment is not high enough, it is possible to draw a relatively large graph first and then get a hologram through a de-scaling process. The fifth step is reconstruction, which is the same as the reconstruction of the optical holography.

After the computer complete encoding of the computer generated hologram, the next step is to display the computer generated hologram in a size and mode which are suitable for optical reconstruction. As the size of each sampling unit in the computer generated hologram is in the order of micron, it needs to use a specialized optical microphotography system or a microlithography system, or a camera if the requirement is relatively low, to microfilm the computer generated hologram which is displayed on a computer screen or printed out on a high resolution photographic film, and then developing and fixing the film to get the computer generated hologram suitable for optical reconstruction. As the recording media is a photographic film, it can only display a static computer generated hologram.

With the development of high resolution electrically-addressed spatial light modulator (SLM) in recent years, amplitude-type or phase-type spatial light modulators having a pixel size in micron scale and the number of pixels over 1 million have become completely practical. The most representative spatial light modulator is a liquid crystal spatial light modulator.

A liquid crystal spatial light modulator is a spatial light modulator fabricated on the base of birefringence effect of liquid crystal molecules; controlled units are independent pixel units and the pixel units are arranged into a one-dimensional or two-dimensional array. Each of the pixel units can independently receive controlling signals such as an optical signal or an electrical signal and the like, and can modulate the input light wave at a pixel order to transform the wavefront of the light wave flexibly.

Figure 1:
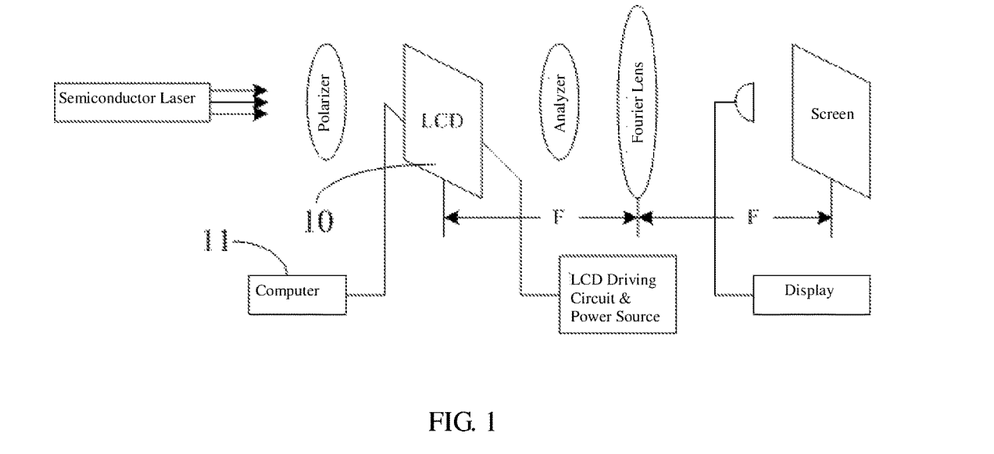
FIG. 1 schematically illustrates a light path when a liquid crystal spatial light modulator is used to realize the reconstruction of a computer generated hologram in a conventional technology.

A light path using a liquid crystal spatial light modulator to realize reconstruction is illustrated as FIG. 1, in which a liquid crystal spatial light modulator 10 is an electrically-addressed liquid crystal spatial light modulator, the liquid crystal spatial light modulator 10 is connected to and receives modulated signals from a computer 11. The computer 11 outputs electrical signals of a computer generated hologram to the liquid crystal spatial light modulator 10. A liquid crystal display (LCD) of the liquid crystal spatial light modulator 10 driven by a driving circuit changes the transmissivity of each of the LCD pixels according to addressing electrical signals so as to transform the electrical signals into spatial light intensity distribution, and F in FIG. 1 represents a focal length of Fourier lens. It is possible to display a dynamic computer generated hologram by using such a liquid crystal spatial light modulator as recording media instead of a photographic film. However, the method needs a very high pixel resolution, it has to be based on silicon based liquid crystal fabrication, and has a relatively high cost, making it not easy to fabricate a large area computer generated hologram.

In summary, when using an optical microphotography system or micro optical system to display a computer generated hologram in conventional technology, it is possible to display a static computer generated hologram only and the process is complex. When a liquid crystal spatial light modulator is used to display a computer generated hologram, it is possible to display a dynamic computer generated hologram, however the fabrication cost is relatively high and it is not easy to fabricate a large area computer generated hologram.

SUMMARY

Embodiments of the disclosure provide a spatial light modulator and a method for displaying a computer generated hologram using the spatial light modulator so as to display a dynamic computer generated hologram in a large area.

The spatial light modulator provided by an embodiment of the disclosure comprises a plurality of MEMS (Micro-Electro-Mechanical System) units arranged in an array, wherein each of the MEMS units corresponds to a pixel of a computer generated hologram and comprises a sensing device, a light shielding portion and a driving device. The sensing device is configured for receiving position information that is obtained through Roman encoding a pixel corresponding to an MEMS unit comprising the sensing device by a computer, and the position information is position information of the light shielding portion when a present frame is displayed. The position information of the light shielding portion when the present frame is displayed is transmitted to the driving device by the sensing device. The driving device is configured for controlling the light shielding portion to move to a position corresponding to the position information of the light shielding portion when the present frame is displayed in response to the received position information of the light shielding portion when the present frame is displayed.

Because the MEMS units arranged in an array are employed in the disclosed technology, it is possible to realize a large area display. As the MEMS units have fast response, the sensing devices in the embodiment of the disclosure can receive position information which is Roman encoded by the computer every time in a relatively short time period, and the driving devices can control the movement of the light shielding portions in a relatively short time period, thus it is possible to display a plurality of frames in a short time period, thereby realizing the display of dynamic computer generated hologram.

As an example, the sensing device comprises a receiving unit and a comparing unit. The receiving unit is configured for receiving position information that is obtained through Roman encoding the pixel corresponding to the MEMS unit comprising the sensing device by a computer. The comparing unit is configured for comparing the position information of the light shielding portion when the present frame is displayed with position information of the light shielding portion at a previous moment, and transmitting the position information of the light shielding portion when the present frame is displayed to the driving device in condition that the position information of the light shielding portion when the present frame is displayed is different from the position information of the light shielding portion at the previous moment, and not transmitting the position information of the light shielding portion when the present frame is displayed to the driving device in condition that the position information of the light shielding portion when the present frame is displayed is not different from the position information of the light shielding portion at the previous moment.

As an example, the driving device comprises a pulling hinge.

As an example, the driving device comprises at least one first pulling hinge configured for controlling the light shielding portion to move along a horizontal direction, and at least one second pulling hinge configured for controlling the light shielding portion to move along a vertical direction.

As an example, the light shielding portion has a shape of a rectangle.

An embodiment of the disclosure further provides a method for displaying a computer generated hologram by using the spatial light modulator. The method comprises: receiving, by each sensing device, position information which is obtained through Roman encoding a pixel corresponding to an MEMS unit comprising the sensing device by a computer, wherein the position information is position information of the light shielding portion of the MEMS unit comprising the sensing device when a present frame is displayed; transmitting, by the sensing device, the position information of the light shielding portion when the present frame is displayed to the driving device; and controlling, by the driving device, the light shielding portion to move to a position corresponding to the position information of the light shielding portion when the present frame is displayed in response to the received position information of the light shielding portion when the present frame is displayed.

As an example, before transmitting the position information of the light shielding portion when the present frame is displayed to the driving device by the sensing device, the method further comprises: comparing, by the sensing device, the position information of the light shielding portion when the present frame is displayed with position information of the light shielding portion at a previous moment, and determining whether transmitting the position information of the light shielding portion when the present frame is displayed to the driving device or not according to the comparing result.

As an example, the step of comparing the position information of the light shielding portion when the present frame is displayed with position information of the light shielding portion at a previous moment comprises: comparing a coordinate value along a horizontal direction of a central position of the light shielding portion when the present frame is displayed to a coordinate value along the horizontal direction of the central position of the light shielding portion at the previous moment; and comparing a coordinate value along a vertical direction of the central position of the light shielding portion when the present frame is displayed to a coordinate value along the vertical direction of the central position of the light shielding portion at the previous moment.

As an example, the step of determining whether transmitting the position information of the light shielding portion when the present frame is displayed to the driving device or not according to the comparing result comprises: transmitting, by the sensing device, the position information of the light shielding portion when the present frame is displayed to the driving device in condition that the position information of the light shielding portion when the present frame is displayed is different from the position information of the light shielding portion at the previous moment; do not transmitting the position information of the light shielding portion when the present frame is displayed to the driving device in condition that the position information of the light shielding portion when the present frame is displayed is not different from the position information of the light shielding portion at the previous moment.

As an example, the step of controlling the light shielding portion to move to a position corresponding to the position information of the light shielding portion when the present frame is displayed comprises: controlling, by the driving device, the light shielding portion to move to a position along a horizontal direction corresponding to the position information of the light shielding portion when the present frame is displayed; or controlling, by the driving device, the light shielding portion to move to a position along a vertical direction corresponding to the position information of the light shielding portion when the present frame is displayed; or controlling, by the driving device, the light shielding portion to move along a horizontal direction and a vertical direction respectively corresponding to the position information of the light shielding portion when the present frame is displayed.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure. Based on the described drawings herein, those skilled in the art can obtain other drawing(s) without any inventive work.

DETAILED DESCRIPTION

In connection with the accompanying drawings of the embodiments of the present disclosure, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms such as "a," "an," etc., are not intended to limit the amount, but indicate the existence of at least one. The terms "comprises," "comprising," "includes," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

A spatial light modulator provided by an embodiment of the disclosure will be described in detail in connection with the drawings.

Figure 2:
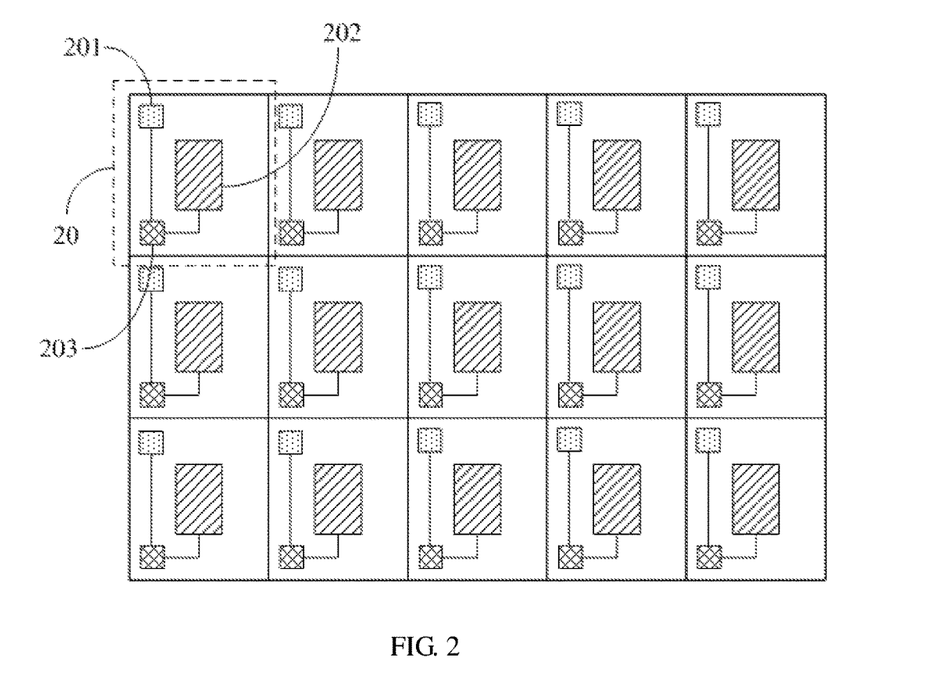
FIG. 2 schematically illustrates a spatial light modulator in accordance with an embodiment of the disclosure.

As illustrated in FIG. 2, an embodiment of the disclosure provides a spatial light modulator comprising a plurality of MEMS units 20 arranged in an array. Each of the MEMS units 20 corresponds to a pixel of a computer generated hologram and comprises a sensing device 201, a light shielding portion 202 and a driving device 203. In a specific implementation, the spatial light modulator in the embodiment of the disclosure comprises a plurality of connecting wires (not illustrated in the drawing) arranged in the array, each row of the MEMS units 20 is connected to a computer (not illustrated in the drawing) through a horizontal connecting wire, and each column of the MEMS units 20 is connected to the computer through a vertical connecting wire.

The sensing device 201 is connected to the driving device 203 to receive position information which is obtained through Roman encoding a pixel corresponding to an MEMS unit 20 comprising the sensing device 201 by a computer, the position information is position information of the light shielding portion 202 when a present frame is displayed, and the position information of the light shielding portion 202 when the present frame is displayed is transmitted to the driving device 203.

The driving device 203 is connected to the light shielding portion 202 to control, in response to the received position information of the light shielding portion 202 when the present frame is displayed, the light shielding portion 202 to move to a position corresponding to the position information of the light shielding portion 202 when the present frame is displayed.

As an example, the Roman encoding method applied to the pixel by the computer in the embodiment of the disclosure is a Roman III type encoding method. The Roman encoding functions to encode the information of phase and amplitude of light wave into the position and size of a light shielding portion respectively. The encoding principle of Roman III type encoding method will be briefly described as follows.

Figure 3:
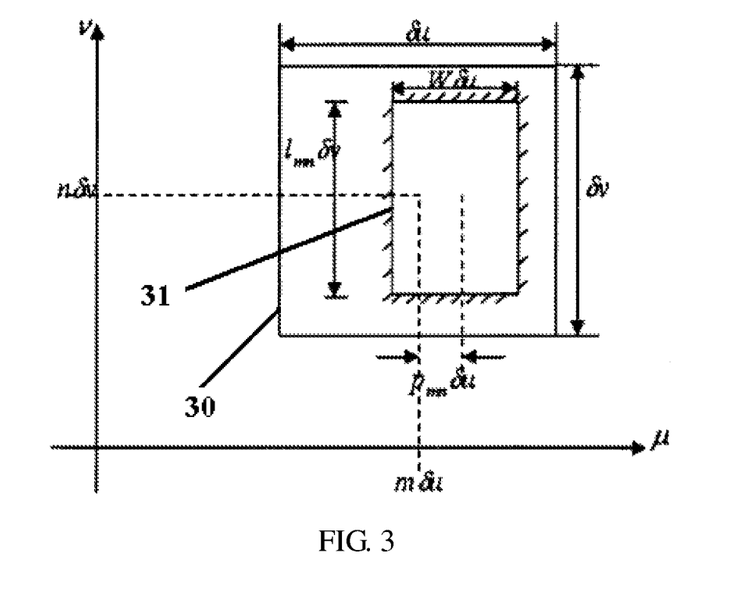
FIG. 3 schematically illustrates the principle of Roman III holographic encoding.

Before encoding the pixels using the Roman III type encoding method, it needs to sample and calculate the pixels first to get a complex amplitude distribution of discrete sampling points on the holographic plane. As illustrated in FIG. 3, each of the discrete sampling points is regarded as a pixel 30, and the width and height of the pixel 30 are δu and δv respectively, where δu and δv represent a sampling interval. A hole having a certain shape is disposed in each of the pixel 30 of the Roman III type computer generated hologram, and a rectangular hole 31 is preferably designed in practice. The area of the rectangular hole 31 is used to modulate the amplitude of wavefront; the position of the rectangular hole 31, i.e., a distance from the center of the rectangular hole 31 to the center of the pixel 30, is used to modulate the phase of wavefront. The width of the rectangular hole 31 of each of the pixels 30 is set to a fixed value. The height $l_{mn}$ of the rectangular hole 31 varies with the amplitude of the sampling point. $p_{mn}$ represents a position where the center of the rectangular hole 31 deviates from the center of the pixel 30, and determines the phase variation. Other parts of the pixel 30 except for the rectangular hole 31 are all light proof or partially light-transparent. According to the detour phase effect, the area of the rectangular hole 31 is deemed as the area of a fringe rectangular hole to modulate an absolute value of the complex amplitude, i.e., a light intensity of the complex amplitude; the position of the rectangular hole 31 is used to modulate a complex angle of the complex amplitude, i.e., the phase of the complex amplitude. Through complex computation, an encoding formula of the Roman III type encoding method for computing a hologram is obtained as follows:

$$l_{mn} = A_{mn}; P_{mn} = \frac{\phi_{mn}}{2\pi}$$

where $A_{mn}$ is the absolute value of the complex amplitude and $\phi_{mn}$ is the complex angle of the complex amplitude.

As an example, the light shielding portion 202 in the embodiment of the disclosure is a rectangular light shielding portion. In a specific implementation, the shape of the light shielding portion 202 may also be of a trapezoid, a hexagon, a triangle, etc. The specific shape of the light shielding portion is not limited in the embodiment of the disclosure. In consideration of the technical difficulty, the sizes of all the light shielding portions 202 in the embodiment of the disclosure are the same. Accordingly, the transmissivity of the light shielding portion 202 in the embodiment of the disclosure can determine the amplitude and the position of the light shielding portion 202 can determine the phase. In another embodiment, the sizes and transmissivity of all the light shielding portions 202 are the same, thus normally realizing a dynamic hologram as well as fast response.

Figure 4:
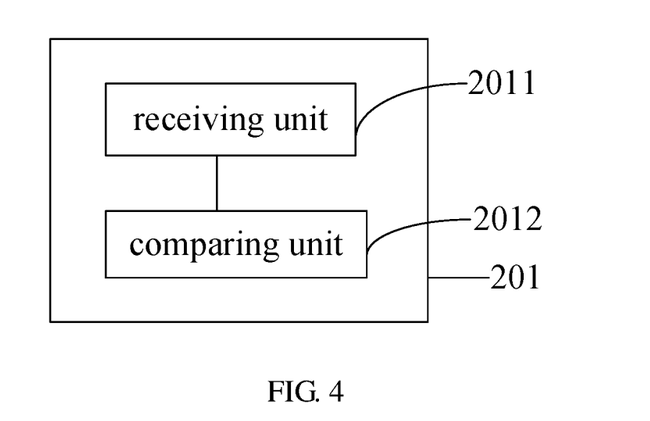
FIG. 4 schematically illustrates a block diagram of a sensing device of the spatial light modulator in accordance with an embodiment of the disclosure.

Preferably, as illustrated in FIG. 4, each of the sensing devices 201 of the MEMS units 20 comprises a receiving unit 2011 and a comparing unit 2012. The receiving unit 2011 is configured for receiving position information that is obtained through Roman encoding a pixel corresponding to an MEMS unit 20 comprising the sensing device 201 by a computer. The comparing unit 2012 is configured for comparing the position information of the light shielding portion 202 when the present frame is displayed with the position information of the light shielding portion 202 at a previous moment. The comparing unit 2012 transmits the position information of the light shielding portion 202 when the present frame is displayed to the driving device 203, in condition that the position information of the light shielding portion 202 when the present frame is displayed is different from the position information of the light shielding portion 202 at the previous moment, and does not transmits the position information of the light shielding portion 202 when the present frame is displayed to the driving device 203, in condition that the position information of the light shielding portion 202 when the present frame is displayed is not different from the position information of the light shielding portion 202 at the previous moment. As an example, when the present frame display is not the first frame display, the comparing unit 2012 compares the position information of the light shielding portion 202 when the present frame is displayed with position information of the light shielding portion 202 at a previous moment. The comparing unit 2012 transmits the position information of the light shielding portion 202 when the present frame is displayed to the driving device 203, in condition that the position information of the light shielding portion 202 when the present frame is displayed is different from the position information of the light shielding portion 202 at the previous moment.

In a specific implementation, the light shielding portion 202 needs to move along both a horizontal direction and a vertical direction respectively. A driving device 203 may be disposed in each of the MEMS units 20, and the driving device 203 can control the light shielding portion 202 to move along the horizontal direction and the vertical direction respectively. Alternatively, a driving device 203 may be disposed along the horizontal direction and another driving device 203 is disposed along the vertical direction. The driving device 203 disposed along the horizontal direction controls the movement of the light shielding portion 202 along the horizontal direction, and the driving device 203 disposed along the vertical direction controls the movement of the light shielding portion 202 along the vertical direction. When two driving devices are disposed in the embodiment of the disclosure, requirements on the structure characteristics of the driving devices are relatively low, and also the manufacture cost is low. However, the above configuration reduces an aperture ratio of the MEMS units 20. As an example, the driving device 203 is a pulling hinge, and the pulling hinge functions similar to a spring and can drive through such as a piezoelectric element. The specific work principle of the pulling hinge in the embodiment of the disclosure is known by those skilled in the art, and it is not elaborated here.

As an example, at least one pulling hinge in the embodiment of the disclosure controls the light shielding portion to move along the horizontal direction, and at least one second pulling hinge configured for controlling the light shielding portion to move along the vertical direction.

Figure 5:
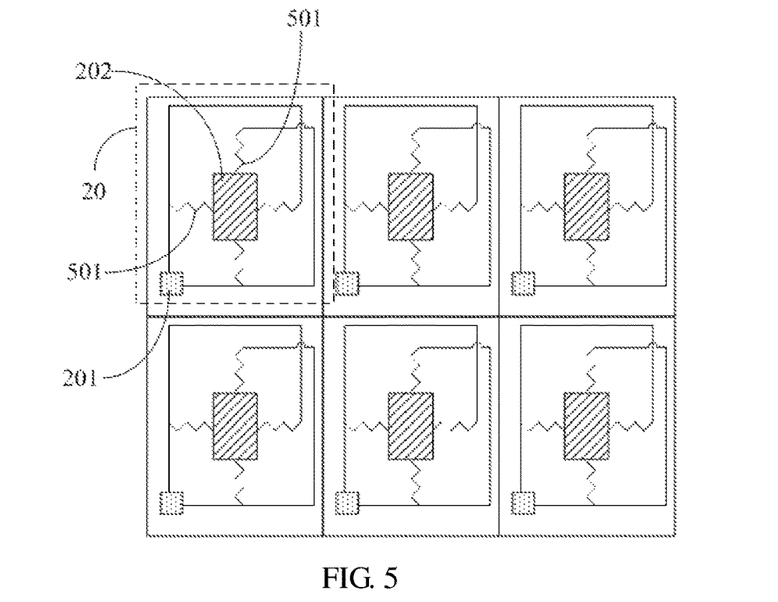
FIG. 5 schematically illustrates another spatial light modulator in accordance with an embodiment of the disclosure.

As an example, as illustrated in FIG. 5, a left side and a right side of the light shielding portion 202 of each of the MEMS units 20 are each connected to a pulling hinge 501 along the horizontal direction. In this case, the light shielding portion 202 can move to the left and to the right respectively along the horizontal direction under control of the pulling hinges 501.

A top side and a bottom side of the light shielding portion 202 of each of the MEMS units 20 are each connected to a pulling hinge 501 along the vertical direction. In this case, the light shielding portion 202 can move to the top and to the bottom respectively along the vertical direction under control of the pulling hinges 501.

In the embodiment of the disclosure, the plurality of MEMS units arranged in an array form a micro-electro-mechanical system (MEMS). An MEMS is a micro device or system that may integrate a sensor, a micro actuator, a micro mechanical structure, a signal processing, a control circuit, a communication or the like, and may have a size of a few millimeters or smaller and has internal structures in micron or even nanometer scale generally. MEMS devices have advantages such as small size, light weight, low energy consumption, low inertia, high resonance frequency, short response time, etc. In the embodiment of the disclosure, a response speed of the spatial light modulator based on an MEMS device is higher than that of the liquid crystal spatial light modulator, thus realizing a fast response and displaying a large area dynamic computer generated hologram.

Figure 6:
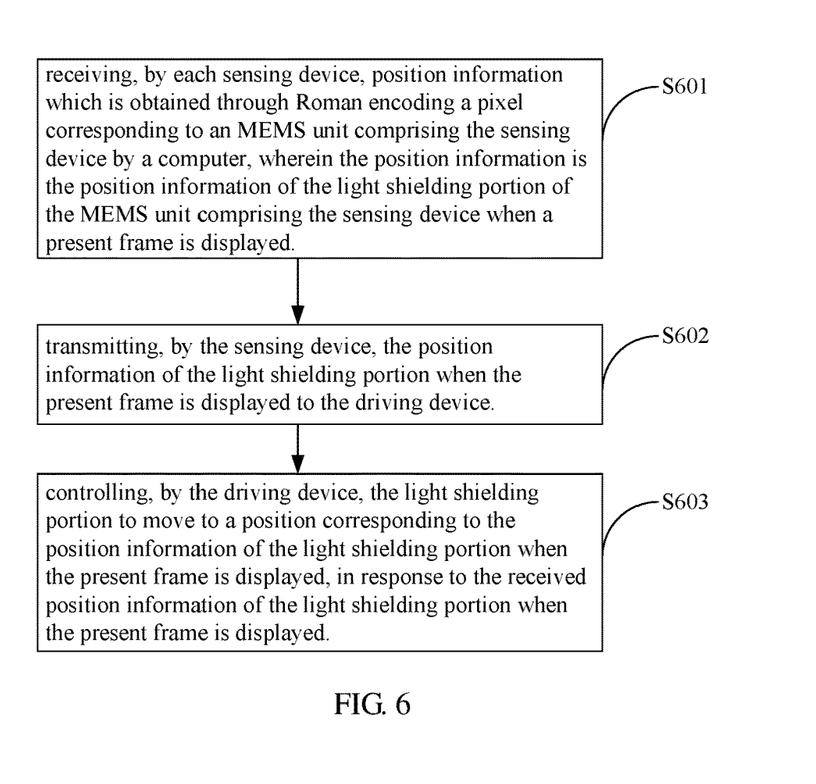
FIG. 6 schematically illustrates a flow chart of a method for displaying a computer generated hologram using a spatial light modulator in accordance with an embodiment of the disclosure.

As illustrated in FIG. 6, the embodiment of the disclosure further provides a method for displaying a computer generated hologram by using the spatial light modulator. The method comprises the following operations.

S601, receiving, by each sensing device, position information which is obtained through Roman encoding a pixel corresponding to an MEMS unit comprising the sensing device by a computer, wherein the position information is the position information of the light shielding portion of the MEMS unit comprising the sensing device when a present frame is displayed.

S602, transmitting, by the sensing device, the position information of the light shielding portion when the present frame is displayed to the driving device.

S603, controlling, by the driving device, the light shielding portion to move to a position corresponding to the position information of the light shielding portion when the present frame is displayed, in response to the received position information of the light shielding portion when the present frame is displayed.

As an example, before transmitting the position information of the light shielding portion when the present frame is displayed to the driving device by the sensing device, the method may further comprise: comparing the position information of the light shielding portion when the present frame is displayed with the position information of the light shielding portion at a previous moment, and according to the comparing result determining whether transmitting the position information of the light shielding portion when the present frame is displayed to the driving device or not.

Specifically, the operation of comparing the position information of the light shielding portion when the present frame is displayed to the position information of the light shielding portion at a previous moment may comprise: comparing, by the comparing unit 2012, a coordinate value along a horizontal direction of a central position of the light shielding portion 202 when the present frame is displayed with a coordinate value along the horizontal direction of the central position of the light shielding portion 202 at a previous moment; and comparing a coordinate value along a vertical direction of the central position of the light shielding portion 202 when the present frame is displayed with a coordinate value along the vertical direction of the central position of the light shielding portion 202 at the previous moment. As an example, the coordinate value along a horizontal direction of the central position of the light shielding portion 202 may be a coordinate value along X axis of the central position of the light shielding portion 202; the coordinate value along a vertical direction of the central position of the light shielding portion 202 may be a coordinate value along Y axis of the central position of the light shielding portion 202.

As an example, after the comparing unit 2012 compares the coordinate value along the horizontal direction of the central position of the light shielding portion 202 when the present frame is displayed with the coordinate value along the horizontal direction of the central position of the light shielding portion 202 at the previous moment and compares the coordinate value along the vertical direction of the central position of the light shielding portion 202 when the present frame is displayed with the coordinate value along the vertical direction of the central position of the light shielding portion 202 at the previous moment, the sensing device 201 in the embodiment of the disclosure does not transmit the position information of the light shielding portion 202 when the present frame is displayed to the driving device 203, in condition that the coordinate value along the horizontal direction of the central position of the light shielding portion 202 when the present frame is displayed is the same as the coordinate value along the horizontal direction of the central position of the light shielding portion 202 at the previous moment and the coordinate value along the vertical direction of the central position of the light shielding portion 202 when the present frame is displayed is the same as the coordinate value along the vertical direction of the central position of the light shielding portion 202 at the previous moment.

If the coordinate value along the horizontal direction of the central position of the light shielding portion 202 when the present frame is displayed is different from the coordinate value along the horizontal direction of the central position of the light shielding portion 202 at the previous moment and the coordinate value along the vertical direction of the central position of the light shielding portion 202 when the present frame is displayed is the same as the coordinate value along the vertical direction of the central position of the light shielding portion 202 at the previous moment, the sensing device 201 in the embodiment of the disclosure transmits the position information of the light shielding portion 202 when the present frame is displayed to the driving device 203, and the driving device 203 controls the light shielding portion 202 to move along the horizontal direction to a position corresponding to the position information of the light shielding portion 202 when the present frame is displayed.

If the coordinate value along the vertical direction of the central position of the light shielding portion 202 when the present frame is displayed is different from the coordinate value along the vertical direction of the central position of the light shielding portion 202 at the previous moment and the coordinate value along the horizontal direction of the central position of the light shielding portion 202 when the present frame is displayed is the same as the coordinate value along the horizontal direction of the central position of the light shielding portion 202 at the previous moment, the sensing device 201 in the embodiment of the disclosure transmits the position information of the light shielding portion 202 when the present frame is displayed to the driving device 203, and the driving device 203 controls the light shielding portion 202 to move along the vertical direction to a position corresponding to the position information of the light shielding portion 202 when the present frame is displayed.

If the coordinate value along the vertical direction of the central position of the light shielding portion 202 when the present frame is displayed is different from the coordinate value along the vertical direction of the central position of the light shielding portion 202 at the previous moment and the coordinate value along the horizontal direction of the central position of the light shielding portion 202 when the present frame is displayed is different from the coordinate value along the horizontal direction of the central position of the light shielding portion 202 at the previous moment, the sensing device 201 in the embodiment of the disclosure transmits the position information of the light shielding portion 202 when the present frame is displayed to the driving device 203, and the driving device 203 controls the light shielding portion 202 to move along the horizontal direction and the vertical direction respectively to a position corresponding to the position information of the light shielding portion 202 when the present frame is displayed.

Furthermore, the inventors perform a simulation through the software MATLAB, and the simulation result represents that the embodiment of the disclosure can reconstruct hologram very well.

In summary, the embodiment of the disclosure provides a spatial light modulator and a method for displaying a computer generated hologram using the spatial light modulator. The spatial light modulator comprises a plurality of MEMS units arranged in an array, and each of the MEMS units corresponds to a pixel of a computer generated hologram and comprises a sensing device, a light shielding portion and a driving device. The sensing device is configured for receiving position information that is obtained through Roman encoding a pixel corresponding to an MEMS unit comprising the sensing device by a computer, and the position information is position information of the light shielding portion when a present frame is displayed; the position information of the light shielding portion when the present frame is displayed is transmitted to the driving device by the sensing device; and the driving device is configured for controlling the light shielding portion to move to a position corresponding to the position information of the light shielding portion when the present frame is displayed, in response to the received position information of the light shielding portion when the present frame is displayed. The embodiment of the disclosure employs MEMS units arranged in an array, thus realizing a large area display. As the MEMS units have fast response, the sensing device in the embodiment of the disclosure can receive position information Roman encoded by the computer every time in a relatively short time period, and the driving device can control the movement of the light shielding portion in a relatively short time period, thus it is possible to display a plurality of frames in a short time period, thereby realizing the display of dynamic computer generated hologram.

The above embodiments are for illustrative purposes only but not limitative to the disclosure. Other variations and modifications may be made by those skilled in the art without departing from the spirit and scope of the disclosure. Therefore, all equivalent technical solutions are with the scope of the disclosure, which is defined by the appended claims.

What is claimed is:

1. A spatial light modulator, comprising a plurality of micro-electro-mechanical system (MEMS) units arranged in an array, wherein each of the MEMS units corresponds to a pixel of a computer generated hologram and comprises a sensing device, a light shielding portion and a driving device;
   wherein the sensing device is configured for receiving present position information that is obtained through using a Roman encoding approach to encode a pixel corresponding to an MEMS unit comprising the sensing device by a computer, the Roman encoding approach encodes phase information of a light wave into a position of the light shielding portion, and the present position information is position information of the light shielding portion when a present frame is displayed;
   wherein the sensing device comprises a comparing unit, and the comparing unit is configured for:
      comparing the present position information of the light shielding portion with previous position information of the light shielding portion at a previous moment; and
      if the present position information of the light shielding portion is different from the previous position information of the light shielding portion, transmitting the present position information to the driving device; and
   wherein the driving device is configured for controlling the light shielding portion to move to a position corresponding to the present position information, in response to receiving the present position information from the sensing device.

2. The spatial light modulator of claim 1, wherein the sensing device comprises a receiving unit;
   the receiving unit is configured for receiving the present position information which is obtained through using the Roman encoding approach to encode the pixel corresponding to the MEMS unit comprising the sensing device by the computer; and
   the comparing unit is configured for not transmitting the present position information of the light shielding portion to the driving device in condition that the present position information of the light shielding portion is not different from the previous position information of the light shielding portion.

3. The spatial light modulator of claim 1, wherein the driving device comprises a pulling hinge.

4. The spatial light modulator of claim 1, wherein the driving device comprises at least one first pulling hinge configured for controlling the light shielding portion to move along a horizontal direction and at least one second pulling hinge configured for controlling the light shielding portion to move along a vertical direction.

5. The spatial light modulator of claim 4, wherein the light shielding portion has a shape of a rectangle.

6. A method for displaying a computer generated hologram by using the spatial light modulator of claim 1, comprising:
   receiving, by each sensing device comprised in a respective MEMS unit, present position information which is obtained through using a Roman encoding approach to encode a pixel corresponding to the respective MEMS unit by a computer,
   wherein the Roman encoding approach encodes phase information of a light wave into a position of the light shielding portion, and the present position information is position information of the light shielding portion of the MEMS unit when a present frame is displayed;
   transmitting, by the sensing device, the present position information to the driving device; and
   controlling, by the driving device, the light shielding portion to move to a position corresponding to the present position information of the light shielding portion when the present frame is displayed in response to receiving the present position information from the sensing device.

7. The method of claim 6, before transmitting the present position information to the driving device by the sensing device, further comprising:
   comparing, by the sensing device, the present position information of the light shielding portion with previous position information of the light shielding portion at a previous moment to obtain a comparison result, and
   determining whether to transmit the present position information to the driving device or not according to the comparison result.

8. The method of claim 7, wherein comparing the present position information of the light shielding portion with the previous position information of the light shielding portion comprises:
   comparing a coordinate value along a horizontal direction of a central position of the light shielding portion when the present frame is displayed to a coordinate value along the horizontal direction of the central position of the light shielding portion at the previous moment; and
   comparing a coordinate value along a vertical direction of the central position of the light shielding portion when the present frame is displayed to a coordinate value along the vertical direction of the central position of the light shielding portion at the previous moment.

9. The method of claim 8, wherein determining whether to transmit the present position information to the driving device or not according to the comparison result comprises:
   transmitting, by the sensing device, the present position information to the driving device in condition that the present position information of the light shielding portion is different from the previous position information of the light shielding portion; and
   otherwise, not transmitting the present position information to the driving device.

10. The method of claim 9, wherein controlling the light shielding portion to move to the position corresponding to the position information of the light shielding portion when the present frame is displayed comprises:
   controlling, by the driving device, the light shielding portion to move along the horizontal direction to the position corresponding to the present position information; or controlling, by the driving device, the light shielding portion to move along the vertical direction to the position corresponding to the present position information; or controlling, by the driving device, the light shielding portion to move along the horizontal direction and the vertical direction respectively corresponding to the present position information.

11. The spatial light modulator of claim 1, wherein the Roman encoding approach further encodes amplitude information of the light wave into a size of the light shielding portion.

12. The spatial light modulator of claim 11, wherein the light shielding portion has a fixed width, and the Roman encoding approach encodes the amplitude information of the light wave into a height of the light shielding portion.

13. The spatial light modulator of claim 1, wherein the Roman encoding approach further encodes amplitude information of the light wave into transmissivity of the light shielding portion.

14. The spatial light modulator of claim 1, wherein:
the position of the light shielding portion is represented by a deviation of a center of the light shielding portion from a center of the MEMS unit comprising the light shielding portion; and
the deviation of the center of the light shielding portion from the center of the MEMS unit comprises:
a first coordinate value that is along a first direction and deviated from the center of the MEMS unit; and
a second coordinate value that is along a second direction and deviated from the center of the MEMS unit, with the first direction being perpendicular to the second direction.

* * * * *